(12) United States Patent
Park et al.

(10) Patent No.: US 12,705,729 B2
(45) Date of Patent: Aug. 11, 2026

(54) METHOD AND APPARATUS WITH SEMICONDUCTOR IMAGE PROCESSING

(71) Applicant: Samsung Electronics Co., Ltd., Suwon-si (KR)

(72) Inventors: Seong-Jin Park, Suwon-si (KR); Seon Min Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 18/356,555

(22) Filed: Jul. 21, 2023

(65) Prior Publication Data

US 2024/0202910 A1 Jun. 20, 2024

(30) Foreign Application Priority Data

Dec. 14, 2022 (KR) ........................ 10-2022-0175047

(51) Int. Cl.
*G06T 3/00* (2024.01)
*G06T 7/00* (2017.01)

(52) U.S. Cl.
CPC ................ *G06T 7/001* (2013.01); *G06T 3/00* (2013.01); *G06T 7/0006* (2013.01); (Continued)

(58) Field of Classification Search
CPC ......... G06T 7/001; G06T 3/00; G06T 7/0006; G06T 2207/20081; G06T 2207/20084; G06T 2207/30148; G06T 1/00; G06T 3/4023; G06T 3/4046; G06T 3/403; G06T 7/149; G03F 1/36; G06N 3/0464; G06N 3/08; G06V 10/774; G06V 10/82; G06V 10/755
See application file for complete search history.

(56) References Cited

U.S. PATENT DOCUMENTS 11,037,311 B2 6/2021 Liu et al.
11,436,436 B2 9/2022 Nakazawa
(Continued)

FOREIGN PATENT DOCUMENTS

CN 113408575 A 9/2021
CN 115018875 A 9/2022
(Continued)

OTHER PUBLICATIONS

Shorten, C., & Khoshgoftaar, T. M. (2019). A survey on image data augmentation for deep learning. Journal of big data, 6(1), 1-48. (Year: 2019).*

(Continued)

*Primary Examiner* — Gregory A Morse
*Assistant Examiner* — Renae A Bitor
(74) *Attorney, Agent, or Firm* — NSIP Law

(57) ABSTRACT

A processor-implemented method includes: identifying input components of a semiconductor pattern of an original input image from the original input image corresponding to an application target of a process for manufacturing a semiconductor, generating an augmented input image by transforming a transformation target comprising one or more of the input components from the original input image; and executing a neural model for estimating pattern transformation according to the process based on the augmented input image.

18 Claims, 12 Drawing Sheets

(52) U.S. Cl.
CPC ............... *G06T 2207/20081* (2013.01); *G06T 2207/20084* (2013.01); *G06T 2207/30148* (2013.01)

(56) References Cited

U.S. PATENT DOCUMENTS

| | | | | |
|---|---|---|---|---|
| 2018/0322234 | A1* | 11/2018 | Cao | G06F 30/39 |
| 2020/0356011 | A1 | 11/2020 | Su et al. | |
| 2020/0380362 | A1* | 12/2020 | Cao | G06N 3/09 |
| 2021/0073972 | A1* | 3/2021 | Wu | G06N 3/0475 |
| 2021/0334444 | A1 | 10/2021 | Lee et al. | |
| 2022/0180503 | A1* | 6/2022 | Oh | G06F 18/22 |
| 2024/0420025 | A1* | 12/2024 | Ren | G03F 7/70525 |

FOREIGN PATENT DOCUMENTS

| | | | |
|---|---|---|---|
| KR | 10-2021-0133364 | A | 11/2021 |
| KR | 10-2022-0027674 | A | 3/2022 |
| KR | 10-2022-0051868 | A | 4/2022 |
| KR | 10-2022-0080768 | A | 6/2022 |
| KR | 10-2022-0094791 | A | 7/2022 |
| KR | 10-2022-0118859 | A | 8/2022 |
| TW | I736262 | B | 8/2021 |

OTHER PUBLICATIONS

"Generating Augmented Data to Train Machine Learning Models to Preserve Physical Trends" Anonymous Research Disclosure by Questel Research Disclosure, Published digitally Nov. 29, 2021, (53 pages).
Extended European search report issued on Feb. 23, 2024, in counterpart European Patent Application No. 23192216.2 (10 pages).
DeVries et al. "Improved Regularization of Convolutional Neural Networks with Cutout" *arXiv preprint arXiv:1708.04552*, Nov. 29, 2017 (pp. 1-8).
Tanabe et al. "Data augmentation in EUV lithography simulation based on convolutional neural network" *DTCO and Computational Patterning*. vol. 12052. SPIE, May 2022 (pp. 1-9).

* cited by examiner

METHOD AND APPARATUS WITH SEMICONDUCTOR IMAGE PROCESSING

CROSS-REFERENCE TO RELATED APPLICATIONS

This application claims the benefit under 35 USC § 119(a) of Korean Patent Application No. 10-2022-0175047, filed on Dec. 14, 2022 in the Korean Intellectual Property Office, the entire disclosure of which is incorporated herein by reference for all purposes.

BACKGROUND

1. Field

The following description relates to a method and apparatus with semiconductor image processing.

2. Description of Related Art

A semiconductor manufacturing process may include detailed processes for processing a wafer. In addition, there are techniques for reducing errors of the detailed processes. For example, optical proximity correction (OPC) may be used for a development process, and process proximity correction (PPC) may be used for an etching process. A neural network may be trained based on deep learning and may perform inference for a desired purpose by mapping input data and output data that are in a nonlinear relationship to each other. The trained ability to generate such mapping may be referred to as a learning ability of the neural network. A neural network may be combined with a semiconductor manufacturing process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: identifying input components of a semiconductor pattern of an original input image from the original input image corresponding to an application target of a process for manufacturing a semiconductor; generating an augmented input image by transforming a transformation target comprising one or more of the input components from the original input image; and executing a neural model for estimating pattern transformation according to the process based on the augmented input image.

The generating of the augmented input image may include generating the augmented input image by removing the transformation target.

The transforming of the transformation target may include any one or any combination of any two or more of removing the transformation target, scaling the transformation target, shifting the transformation target, and rotating the transformation target.

A portion not corresponding to the transformation target of the original input image may be maintained in the augmented input image.

The identifying of the input components may include identifying, as an input component of the input components, a group of pixels comprising pixel values that are not zero in the original input image and that are connected to one another.

The method may include training the neural model according to an execution result of the neural model.

The method may include: identifying output components of a semiconductor pattern of an original output image from the original output image corresponding to an application result of the process; and generating an augmented output image by applying transformation corresponding to transformation of the transformation target of the original input image to the output components of the original output image, wherein the training of the neural model may include training the neural model according to a difference between the augmented output image and a result image corresponding to the execution result of the neural model.

The method may include: executing the neural model based on the original input image; and estimating the pattern transformation according to the process by combining the execution result of the neural model based on the original input image and the execution result of the neural model based on the augmented input image.

The process may include either one or both of a development process and an etching process.

In one or more general aspects, a non-transitory computer-readable storage medium stores instructions that, when executed by a processor, configure the processor to perform any one, any combination, or all of operations and/or methods described herein.

In one or more general aspects, a processor-implemented method includes: identifying input components of a semiconductor pattern of an original input image and output components of a semiconductor pattern of an original output image respectively from the original input image corresponding to an application target of a process for manufacturing a semiconductor and the original output image corresponding to an application result of the process; determining component pairs based on a matching relationship between the input components and the output components; generating an augmented input image and an augmented output image by removing a transformation target comprising one or more of the component pairs from the original input image and the original output image; and training a neural model for predicting pattern transformation according to the process based on the augmented input image and the augmented output image.

In one or more general aspects, an apparatus includes: one or more processors configured to: identify input components of a semiconductor pattern of an original input image from the original input image corresponding to an application target of a process for manufacturing a semiconductor; generate an augmented input image by transforming a transformation target comprising one or more of the input components from the original input image; and execute a neural model for estimating pattern transformation according to the process based on the augmented input image.

For the generating of the augmented input image, the one or more processors may be configured to generate the augmented input image by removing the transformation target.

For the transforming of the transformation target, the one or more processors may be configured to perform any one or any combination of any two or more of removing the transformation target, scaling the transformation target, shifting the transformation target, and rotating the transformation target.

A portion not corresponding to the transformation target of the original input image may be maintained in the augmented input image.

For the identifying of the input components, the one or more processors may be configured to identify, as one input component of the input components, a group of pixels comprising pixel values that are not zero in the original input image and that are connected to one another.

The one or more processors may be configured to train the neural model according to an execution result of the neural model.

The one or more processors may be configured to: identify output components of a semiconductor pattern of an original output image from the original output image corresponding to an application result of the process; generate an augmented output image by applying transformation corresponding to transformation of the transformation target of the original input image to the output components of the original output image; and train the neural model according to a difference between the augmented output image and a result image corresponding to the execution result of the neural model.

The one or more processors may be configured to: execute the neural model based on the original input image; and estimate the pattern transformation according to the process by combining the execution result of the neural model based on the original input image and the execution result of the neural model based on the augmented input image.

The process may include either one or both of a development process and an etching process.

Other features and aspects will be apparent from the following detailed description, the drawings, and the claims.

Figure 1:
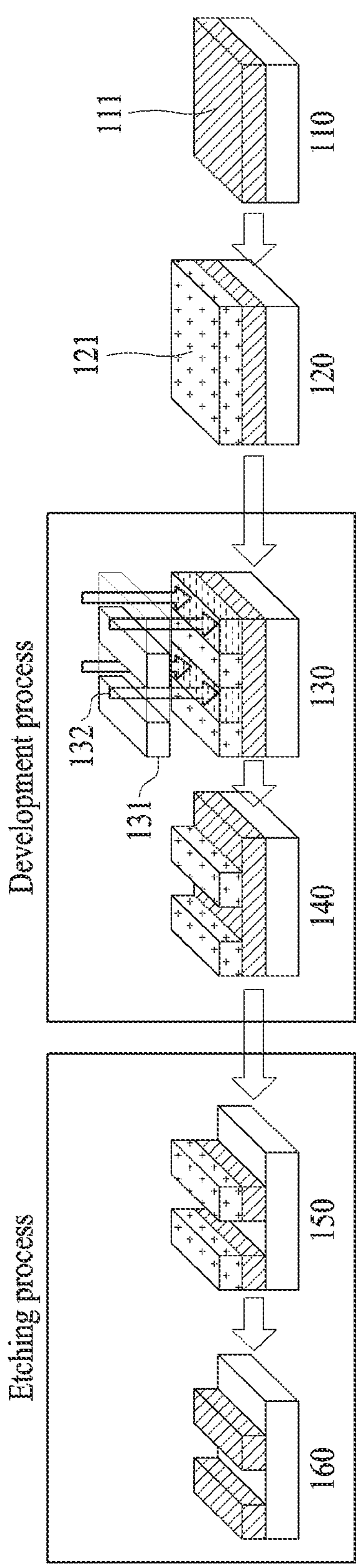
FIG. 1 illustrates an example of a semiconductor manufacturing process.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. The singular forms "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Hereinafter, the examples are described in detail with reference to the accompanying drawings. When describing the examples with reference to the accompanying drawings, like reference numerals refer to like elements and a repeated description related thereto will be omitted.

FIG. 1 illustrates an example of a semiconductor manufacturing process. Referring to FIG. 1, the semiconductor manufacturing process may include various detailed processes for processing a wafer 111. The wafer 111 may be generated in a first stage 110, and a photoresist 121 may be applied on the wafer 111 in a second stage 120.

In a third stage 130, light 132 may be projected to the photoresist 121 through a mask 131. An exposed region of the photoresist 121 to the light 132 may be determined according to a pattern of the mask 131, and the pattern of the mask 131 may be formed in the photoresist 121 in a fourth stage 140 when the exposed region of the photoresist 121 is removed by the light 132. The third stage 130 and the fourth stage 140 may be included in a development process. An exposed region of the wafer 111 may be determined based on the pattern formed in the photoresist 121 (e.g., the exposed region of the wafer 111 may correspond to the exposed region of the photoresist 121), and etching may be performed on the exposed region of the wafer 111 in a fifth stage 150. The pattern of the photoresist 121 may be formed in the wafer 111 when the exposed region of the wafer 111 is removed. The photoresist 121 may be removed in a sixth stage 160. The fifth stage 150 and the sixth stage 160 may be included in an etching process.

Figure 2:
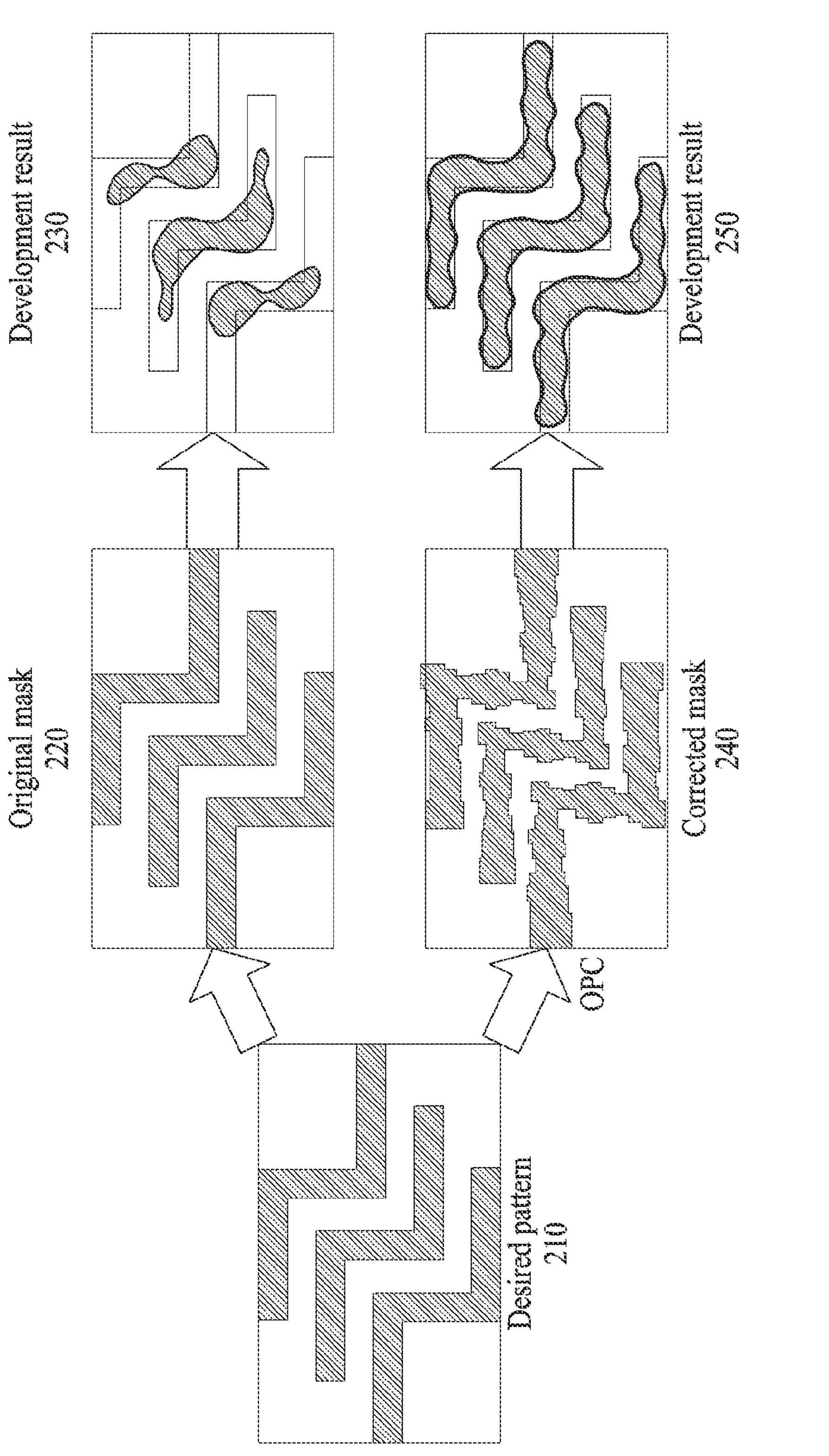
FIG. 2 illustrates an example of a difference between development results according to whether the development results are corrected.

FIG. 2 illustrates an example of a difference between development results (e.g., development results of the development process of FIG. 1) according to whether the development results are corrected. In a typical semiconductor manufacturing process, when an original mask 220 according to a desired or determined pattern 210 is used, a development result 230 having a significant error compared to the desired pattern 210 may be generated due to diffraction of light, a process error, and the like. Correction may be performed on the original mask 220 to reduce an error. A typical correction method for a development process may include optical proximity correction (OPC), and a typical correction method for an etching process may include process proximity correction (PPC).

FIG. 2 may be an example of the OPC for a development process. A corrected mask 240 may be determined according to the OPC, and a development result 250 having a slight error through the corrected mask 240. The typical correction method may include an operation of fragmenting an initial mask, an operation of simulating a processing result according to the initial mask, an operation of determining a new mask by correcting fragments of the initial mask according to a preset correction rule with reference to a simulation result, and an operation of simulating a processing result according to the new mask. According to the typical correction method, a final pattern may be derived through repetitive displacement using the preset correction rule.

Figure 3:
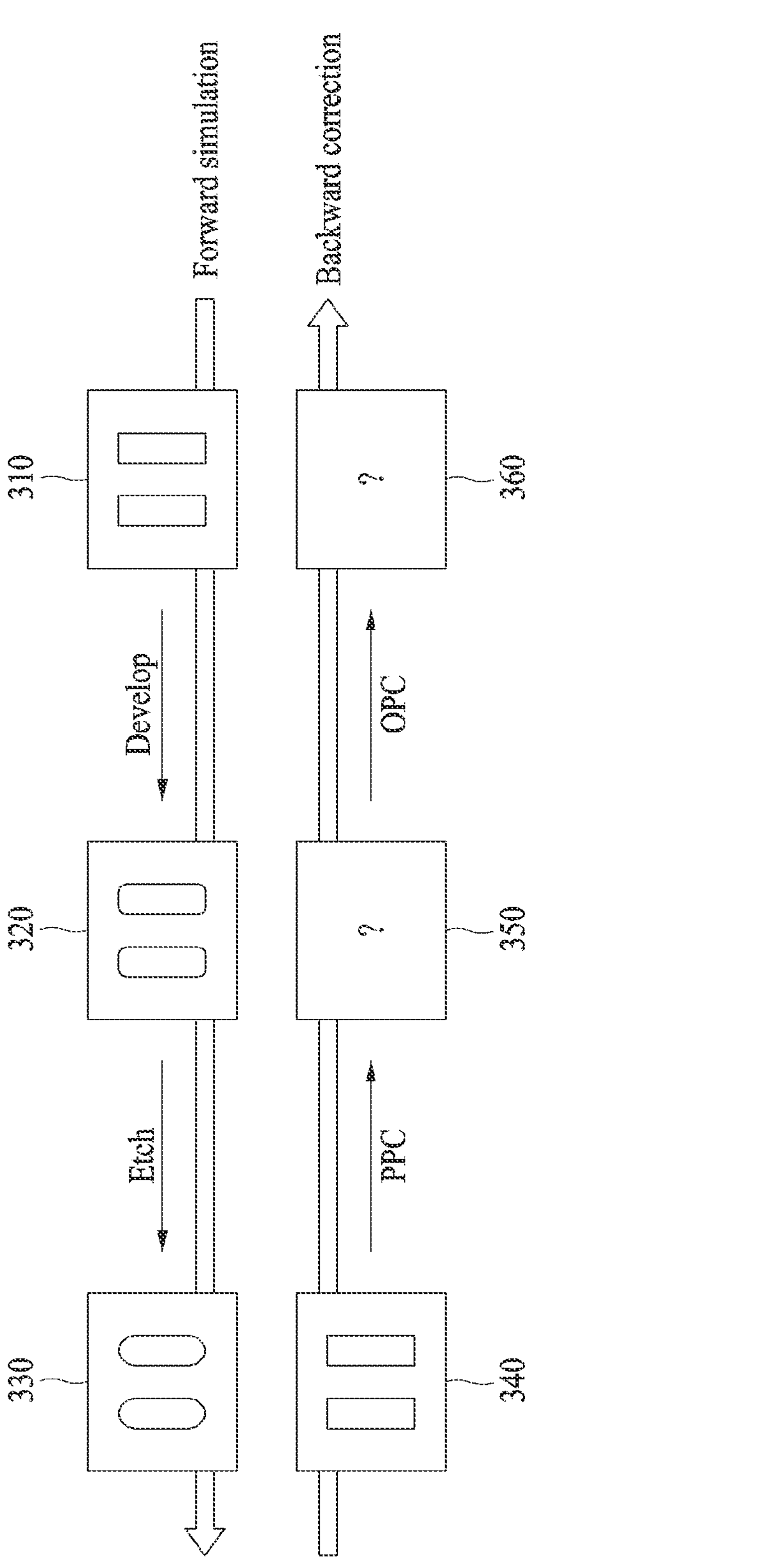
FIG. 3 illustrates an example of forward simulation and backward correction in a semiconductor manufacturing process.

FIG. 3 illustrates an example of forward simulation and backward correction in a semiconductor manufacturing process. Referring to FIG. 3, a second pattern image 320 may be determined through forward simulation of a development process for a first pattern image 310, and a third pattern image 330 may be determined through forward simulation of an etching process for the second pattern image 320. A simulation model considering the various features, conditions, variables, and the like of a semiconductor process may be used for forward simulation. For example, the second pattern image 320 may be determined when transformation that may occur in the development process through the forward simulation for the first pattern image 310 is reflected on the first pattern image 310, and the third pattern image 330 may be determined when transformation that may occur in the etching process through the forward simulation for the second pattern image 320 is reflected on the second pattern image 320. In a non-limiting example, the first pattern image 310 may show a mask over a photoresist, the second pattern image 320 may show an exposed region of the photoresist removed by the light, and the third pattern image 330 may show a pattern of the photoresist formed in a wafer after an etching process.

When there is an error between the first pattern image 310 corresponding to a desired pattern and the third pattern image 330 corresponding to a result of the etching process, backward correction may be performed to reduce the error. Typical backward correction may include PPC for the etching process and OPC for the development process. A typical correction method may be performed according to a preset correction rule. A fifth pattern image 350 may be generated according to PPC for a fourth pattern image 340. The fourth pattern image 340 may correspond to the desired pattern, and the fifth pattern image 350 may correspond to a correction result for deriving the desired pattern according to the etching process. A sixth pattern image 360 may be generated according to OPC for the fifth pattern image 350. The sixth pattern image 360 may correspond to a correction result for deriving the fifth pattern image 350 according to the development process.

Figure 4:
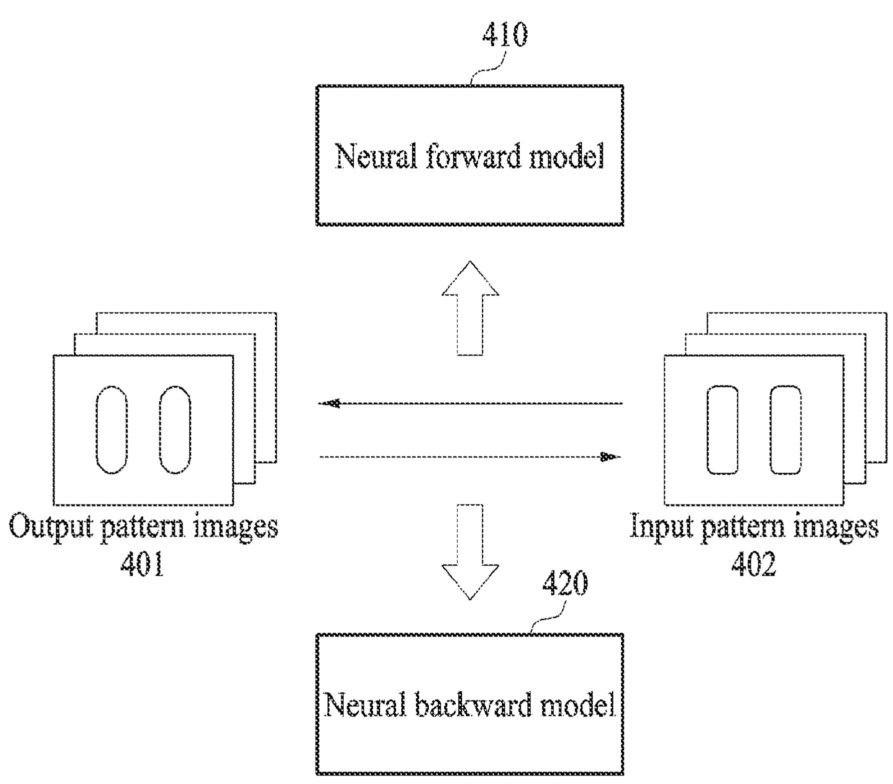
FIG. 4 illustrates an example of a training process of a neural forward model and a training process of a neural backward model.

FIG. 4 illustrates an example of a training process of one or more embodiments of a neural forward model and a training process of one or more embodiments of a neural backward model. According to one or more embodiments, a neural model may be used to estimate pattern transformation according to a target process for manufacturing a semiconductor. The target process may include a development process and/or an etching process. The pattern transformation according to the target process may include transformation according to forward simulation of the target process and transformation according to backward correction of the target process. The neural model may include a neural forward model 410 for performing the forward simulation of the target process and a neural backward model 420 for performing the backward correction of the target process.

Referring to FIG. 4, the neural forward model 410 and the neural backward model 420 may be trained based on output pattern images 401 and input pattern images 402. The input pattern images 402 may correspond to an application target of the target process, and the output pattern images 401 may correspond to an application result of the target process. In a non-limiting example, the input pattern images 402 may correspond to masks over photoresists and the output pattern images 401 may correspond to patterns of the photoresists formed in wafers after an etching process.

The neural forward model 410 and the neural backward model 420 may each include a neural network. The neural network may include a deep neural network (DNN) including a plurality of layers. The DNN may include at least one of a fully connected network (FCN), a convolutional neural network (CNN), and/or a recurrent neural network (RNN). For example, at least some of the plurality of layers in the neural network may correspond to the CNN, and the others may correspond to the FCN. The CNN may be referred to as convolutional layers, and the FCN may be referred to as fully connected layers.

The neural network may be trained based on deep learning and perform inference suitable for a training purpose by mapping input data and output data that are in a nonlinear relationship to each other. The deep learning may be a machine learning technique for solving an issue, such as image or speech recognition, from a big data set. The deep learning may be understood as a process of solving an optimization issue to find a point at which energy is minimized while training a neural network by using prepared training data. Through supervised or unsupervised learning of deep learning, a weight corresponding to an architecture or model of the neural network may be obtained. Through the weight, the input data and the output data may be mapped to each other. For example, when the width and depth of the neural network are sufficiently large, the neural network may have a capacity large enough to implement an arbitrary function. When the neural network is trained on a sufficiently large quantity of training data through an appropriate training process, optimal performance may be achieved.

The neural network may be expressed as being trained in advance, in which "in advance" means "before" the neural network is started. The "started" neural network may indicate that the neural network may be ready for inference. For example, the "start" of the neural network may include the loading of the neural network in a memory, or an input of input data for inference to the neural network when the neural network is loaded in the memory.

The neural forward model 410 may be trained in advance to perform the forward simulation of the target process. The neural forward model 410 may be trained by using the input pattern images 402 and the output pattern images 401 to estimate the output pattern images 401 from the input pattern images 402. The neural backward model 420 may be trained in advance to perform the backward correction of the target process. The backward model 420 may be trained by using the input pattern images 402 and the output pattern images 401 to estimate the input pattern images 402 from the output pattern images 401.

The estimation accuracy of the neural model may depend on the quality of training data, such as the input pattern images 402 and the output pattern images 401. High costs may be incurred to obtain the input pattern images 402 and the output pattern images 401 because of the features of a semiconductor process. A data augmentation technique of one or more embodiments may reduce the costs of obtaining the training data. According to one or more embodiments, the data augmentation technique for reducing the cost of training the neural model may be provided. In this case, the performance of a training result may vary depending on augmentation methods. According to one or more embodiments, the neural model may be trained to have high estimation accuracy through an augmentation method suitable for the feature of a semiconductor pattern image. In addition, the data augmentation technique may be used to improve the estimation accuracy of an inference operation of the neural model.

Figure 5:
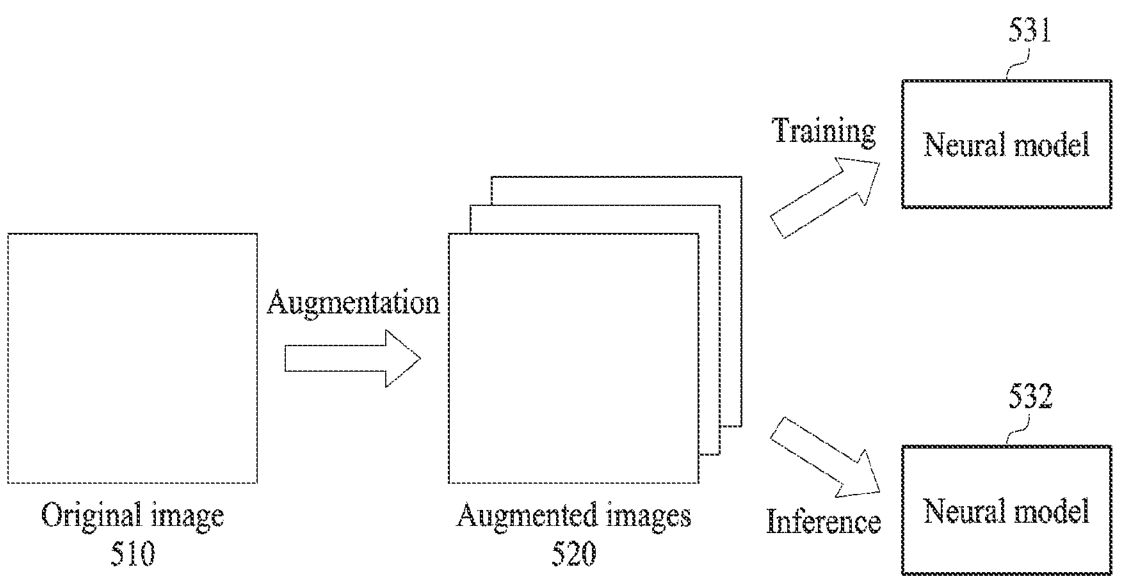
FIG. 5 illustrates an example of a process of augmenting and using a semiconductor image.

FIG. 5 illustrates an example of a process of augmenting and using a semiconductor image. Referring to FIG. 5, augmented images 520 may be generated according to data augmentation performed on an original image 510. The original image 510 may represent a semiconductor pattern, and the data augmentation may be performed based on each semantic component of the original image 510. A semantic component may be simply referred to as a component. Components may be distinguished based on pixel values. A group of pixels having a pixel value that is not 0 and connected (e.g., determined to correspond to a same component) to one another may form a component. Pixels included in the same component may be connected to one another, and pixels included in different components may not be connected to one another. For example, pixels in a first component may be grouped together, and pixels in a second component may be grouped together.

An augmentation operation may be performed in a component unit. A transformation target including at least one of components may be selected from among components of the original image 510, and transformation may be performed on the transformation target. The transformation may include at least one of removing of the transformation target, scaling of the transformation target, shifting of the transformation target, and/or rotating of the transformation target. However, the types of transformation may not be limited to the foregoing examples. For example, the augmented images 520 may be generated by removing different transformation targets. A portion not corresponding to the transformation target of the original image 510 may be maintained in the augmented images 520.

The original image 510 and the augmented images 520 may be used for the training of a neural model 531 or the inference of a neural model 532. The neural models 531 and 532 may correspond to a neural forward model for estimating pattern transformation according to a forward process and/or a neural backward model for estimating pattern transformation according to backward correction. The neural models 531 and 532 may be the same or different from each other. For example, when the training of the neural model 531 is completed based on first augmented images according to the augmentation of a first original image, the inference of the neural model 532 may be performed based on second augmented images according to the augmentation of a second original image. In this case, the neural models 531 and 532 may be the same (e.g., the neural model 532 may be the trained neural model 531). Alternatively, the neural model 532 may be trained in a method that is not data augmentation and may perform an inference operation based on the second augmented images.

When the original image 510 and the augmented images 520 are used for the training of the neural model 531, the original image 510 and the augmented images 520 may include input pattern images and output pattern images. When the neural model 531 corresponds to the neural forward model, the neural model 531 may be trained to estimate the output pattern images from the input pattern images. When the neural model 531 corresponds to the neural backward model, the neural model 531 may be trained to estimate the input pattern images from the output pattern images.

The neural model 531 may be trained through an augmented input image and an augmented output image according to augmentation operations corresponding to each other. The augmented input image may be generated through transformation of a transformation target of an input pattern image, and the augmented output image may be generated by applying transformation corresponding to the transformation of the transformation target of the input pattern image to an output pattern image. When a result image corresponding to an execution result of the neural model 531 based on the augmented input image is determined, the neural model 531 may be trained to reduce a difference between the result image and the augmented output image.

When the original image 510 and the augmented images 520 are used for the inference of the neural model 532, the original image 510 and the augmented images 520 may correspond to input pattern images or output pattern images. When the neural model 532 corresponds to the neural forward model, the original image 510 and the augmented images 520 may correspond to the input pattern images, and the neural model 532 may estimate the output pattern images from the input pattern images. When the neural model 532 corresponds to the neural backward model, the original image 510 and the augmented images 520 may correspond to the output pattern images, and the neural model 532 may estimate the input pattern images from the output pattern images.

When the neural model 532 corresponds to the neural forward model, the original image 510 may correspond to an input pattern image. The augmented images 520 may be generated through transformation of the transformation of the original image 510. The neural model 532 may be executed by using the original image 510 and the augmented images 520, and result images corresponding to an execution result may be determined. A pattern corresponding to a result of a forward process may be estimated through the combination of the result images. When the neural model 532 corresponds to the neural backward model, the original image 510 may be an output pattern image. When the augmented images 520 are generated through an augmentation operation, and when the neural model 532 is executed by using the original image 510 and the augmented images 520, result images corresponding to an execution result may be determined. A pattern corresponding to a result of backward correction may be estimated through the combination of the result images. An ensemble weight may be used to combine the result images.

Figure 6:
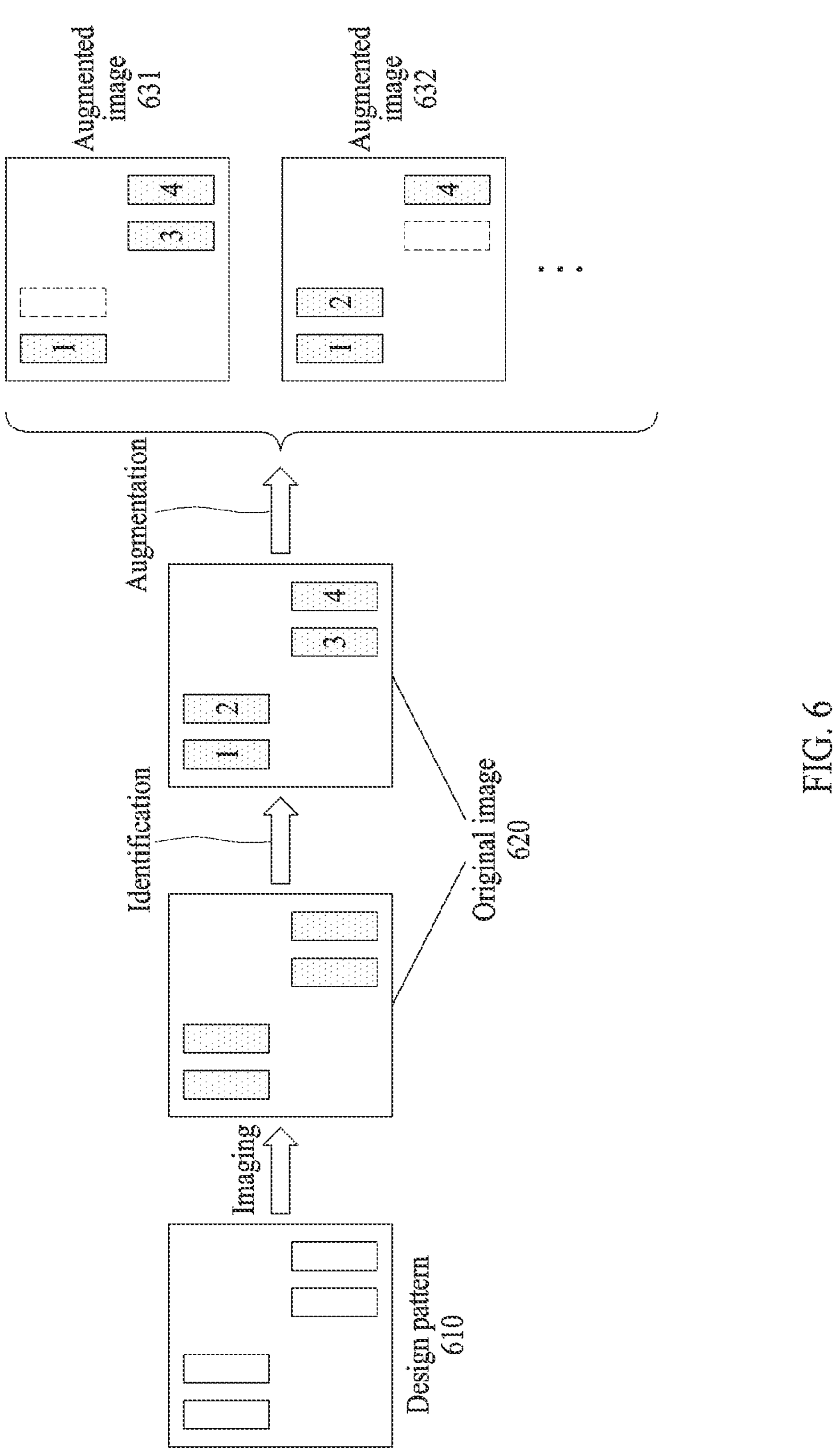
FIG. 6 illustrates an example of an augmentation process by removing a semantic component.

FIG. 6 illustrates an example of an augmentation process by removing a semantic component. Referring to FIG. 6, an original image 620 may be determined according to an imaging operation performed on a design pattern 610. The design pattern 610 may represent a 3-dimensional (3D) design structure of an input pattern corresponding to an application target of a target process or an output pattern corresponding to an application result of the target process. The design pattern 610 may express the 3D design structure through detailed polygonal structures. The imaging of the design pattern 610 may correspond to a rendering operation of structural data on a 3D design into image data.

The original image 620 may include components corresponding to a semiconductor pattern. The components of the original image 620 may be identified through a component identification operation performed on the original image 620. The component identification operation may be performed based on pixel values of pixels of the original image 620. Pixels, of which pixel values are not 0, may be selected from the original image 620, and pixels connected to one another among the selected pixels may be identified as one component. A label may be assigned to each component according to a position in the original image 620. FIG. 6 illustrates an example of labels 1 to 4 respectively assigned to components. A component having a label k may be referred to as a kth component.

Augmented images 631 and 632 may be generated through an augmentation operation performed on the original image 620. The augmentation operation may include selection of a transformation target and transformation of the transformation target. Each transformation target may include at least one component. For example, a first component may correspond to a first transformation target, a second component may correspond to a second transformation target, and a third component may correspond to a third transformation target. In addition or alternatively, the first and second components may correspond to a fourth transformation target, and the third and fourth components may correspond to a fifth transformation target.

The transformation may include at least one of removing of the transformation target, scaling of the transformation target, shifting of the transformation target, and/or rotating of the transformation target. However, the types of transformation may not be limited to the foregoing examples. The same transformation operation may be performed on different transformation targets, different transformation operations may be respectively performed on the different transformation targets, or the different transformation operations may be performed on the same transformation target. The augmented image 631 may represent a result of an augmentation operation corresponding to the removal of the second transformation target from the original image 620, and the augmented image 632 may represent a result of an augmentation operation corresponding to the removal of the third transformation target from the original image 620.

Figure 7:
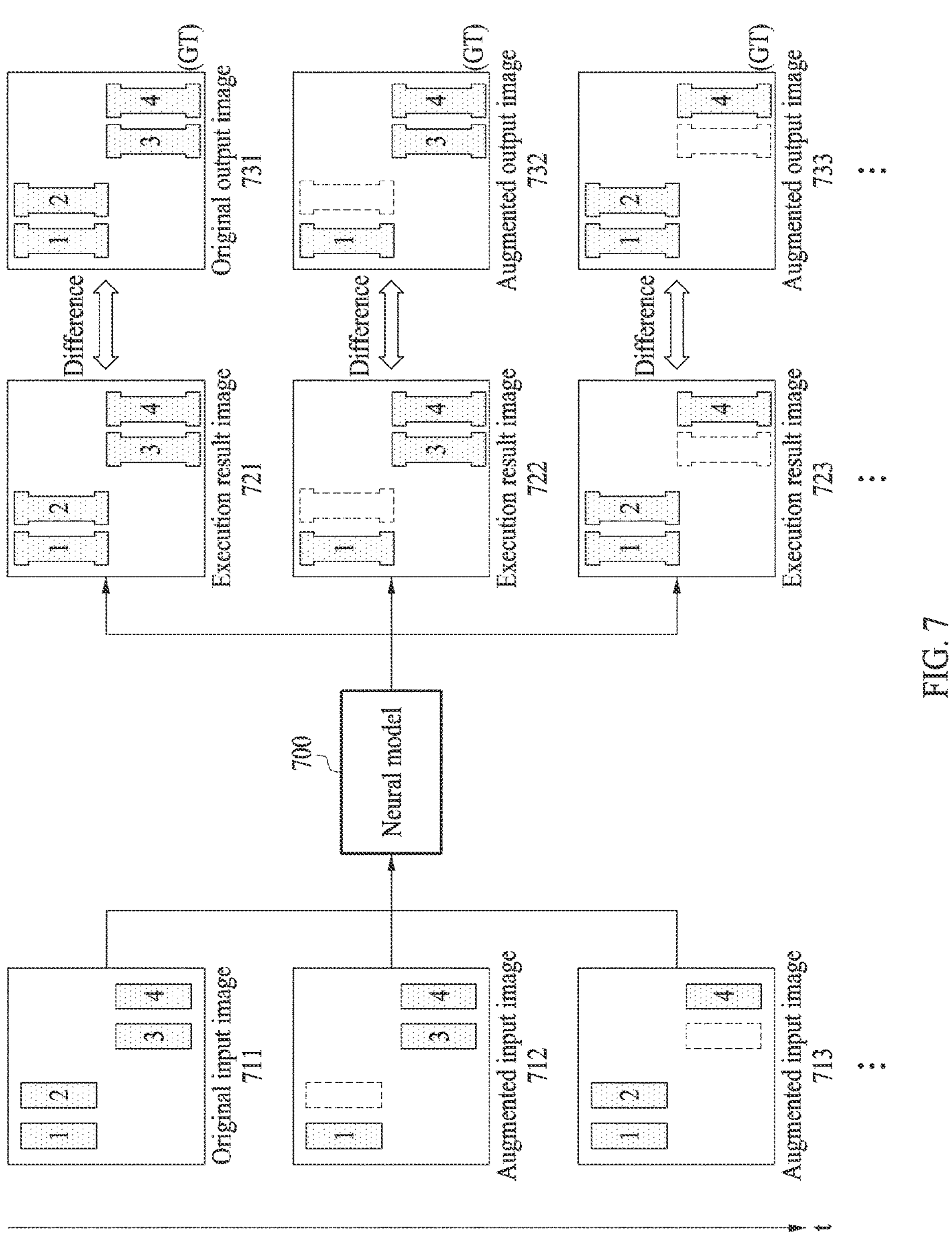
FIG. 7 illustrates an example of a training process of a neural model by using augmentation data.

FIG. 7 illustrates an example of a training process of a neural model by using augmentation data. Referring to FIG. 7, augmented input images 712 and 713 may be generated according to augmentation of an original input image 711, and a neural model 700 may be executed using the original input image 711 and/or the augmented input images 712 and 713 as inputs. The original input image 711 and the augmented input images 712 and 713 may be sequentially input to the neural model 700, and execution result images 721, 722, and 723 may be generated according to the execution of the neural model 700. A time axis on the left may represent that the training is sequentially performed. When parallel execution of the neural model 700 is implemented, the execution result images 721, 722, and 723 may be parallelly generated according to the original input image 711 and the augmented input images 712 and 713 through the parallel execution of the neural model 700.

When an original output image 731 corresponding to the original input image 711 is provided as an original image, augmented output images 732 and 733 may be generated according to augmentation of the original output image 731. The same augmentation operation used to generate the augmented input images 712 and 713 may be applied to the original output image 731, and the augmented output images 732 and 733 may be thereby generated. For example, the augmented input image 712 may be generated by removing a second input component of the original input image 711, and the augmented input image 713 may be generated by removing a third input component of the original input image 711. As an augmentation operation corresponding to the foregoing example, the augmented output image 732 may be generated by removing a second output component of the original output image 731, and the augmented output image 733 may be generated by removing a third output component of the original output image 731. To distinguish components, a component of an input image may be referred to as an input component, and a component of an output image may be referred to as an output component.

The original output image 731 and the augmented output images 732 and 733 may be used as ground truth (GT). The neural model 700 may be trained to reduce a difference between an execution result (e.g., the execution result images 721, 722, and 723) and the GT. For example, the neural model 700 may be trained to reduce a difference between the execution result image 721 and the original output image 731, a difference between the execution result image 722 and the augmented output image 732, and a difference between the execution result image 723 and the augmented output image 733.

Multiple times or iterations of training of the neural model 700 may be performed through data augmentation with respect to an original image set (e.g., the original input image 711 and the original output image 731), and more times of training may be performed when a plurality of original image sets are provided. By training through data augmentation with respect to one or more original image sets, the training process of one or more embodiments may greatly decrease the difficulty in securing training data due to costs incurred by obtaining a semiconductor image.

FIG. 7 illustrates an example of the original input image 711 corresponding to an input pattern image and the original output image 731 corresponding to an output pattern image. In this example, the neural model 700 may be trained to be a neural forward model. Alternatively or additionally, the original input image 711 may correspond to an output pattern image, and the original output image 731 may correspond to an input pattern image. In this case, the neural model 700 may be trained to be a neural backward model.

Figure 8:
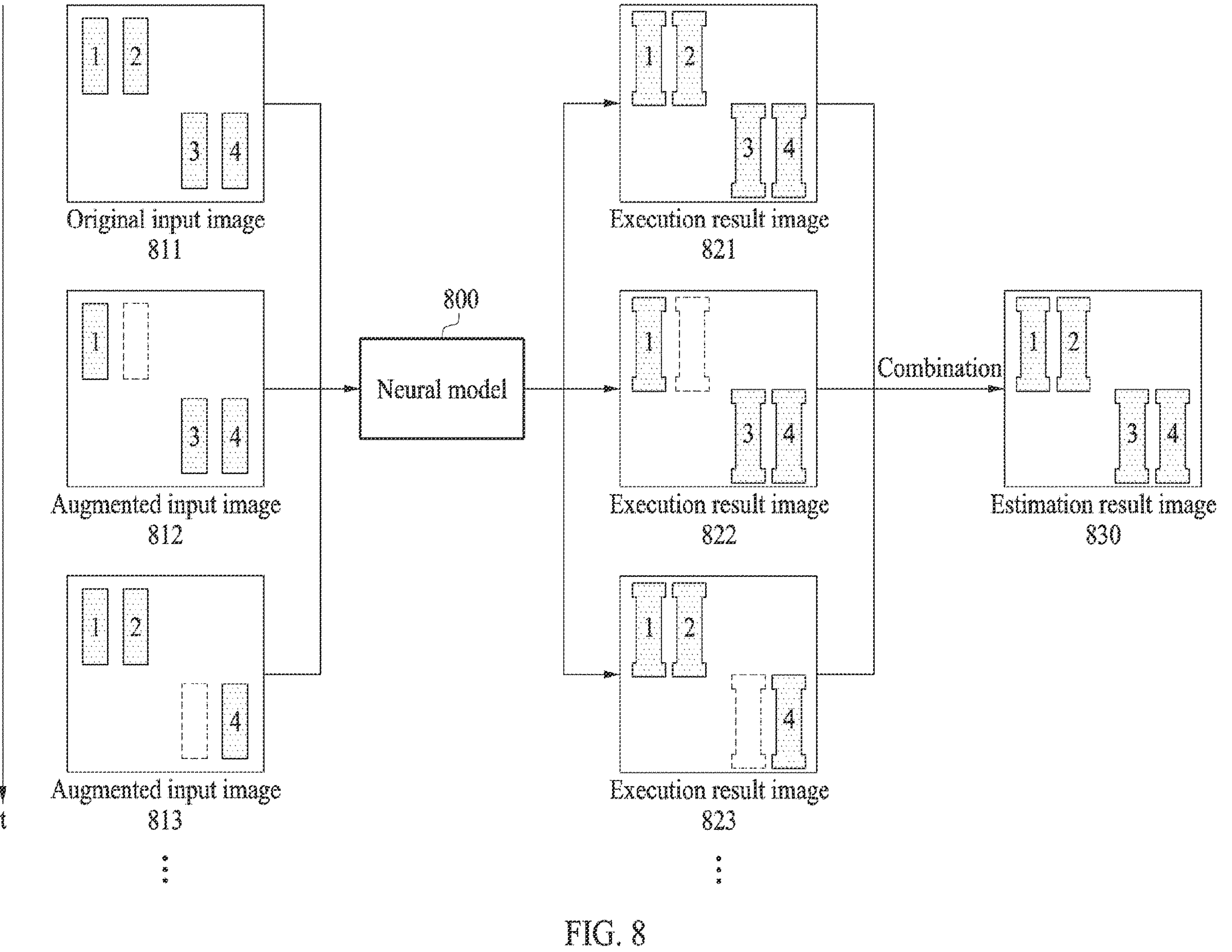
FIG. 8 illustrates an example of an inference process of a neural model by using augmentation data.

FIG. 8 illustrates an example of an inference process of a neural model by using augmentation data. Referring to FIG. 8, augmented input images 812 and 813 may be generated according to augmentation of an original input image 811, and a neural model 800 may be executed using the original input image 811 and/or the augmented input images 812 and 813 as inputs. The original input image 811 and the augmented input images 812 and 813 may be sequentially input to the neural model 800, and execution result images 821, 822, and 823 may be generated according to the execution of the neural model 800. A time axis on the left may represent that inference is sequentially performed. When parallel execution of the neural model 800 is implemented, the execution result images 821, 822, and 823 may be parallelly generated according to the original input image 811 and the augmented input images 812 and 813 through the parallel execution of the neural model 800.

An estimation result image 830 may be determined by combining the execution result images 821, 822, and 823. The execution result images 821, 822, and 823 may be combined based on a certain weight. According to an embodiment, the neural model 800 may correspond to an ensemble model, and an ensemble weight may be used to combine the execution result images 821, 822, and 823. The inference process of one or more embodiments may increase the accuracy of inference by using pieces of data from various perspectives through data augmentation.

The example illustrated in FIG. 7 may be an example of the neural model 800 corresponding to a neural forward model. In this example, the original input image 811 may correspond to an input pattern image, and the estimation result image 830 may correspond to an output pattern image. Alternatively, the neural model 800 may correspond to a neural backward model. In this case, the original input image 811 may correspond to an output pattern image, and the estimation result image 830 may correspond to an input pattern image.

Figure 9:
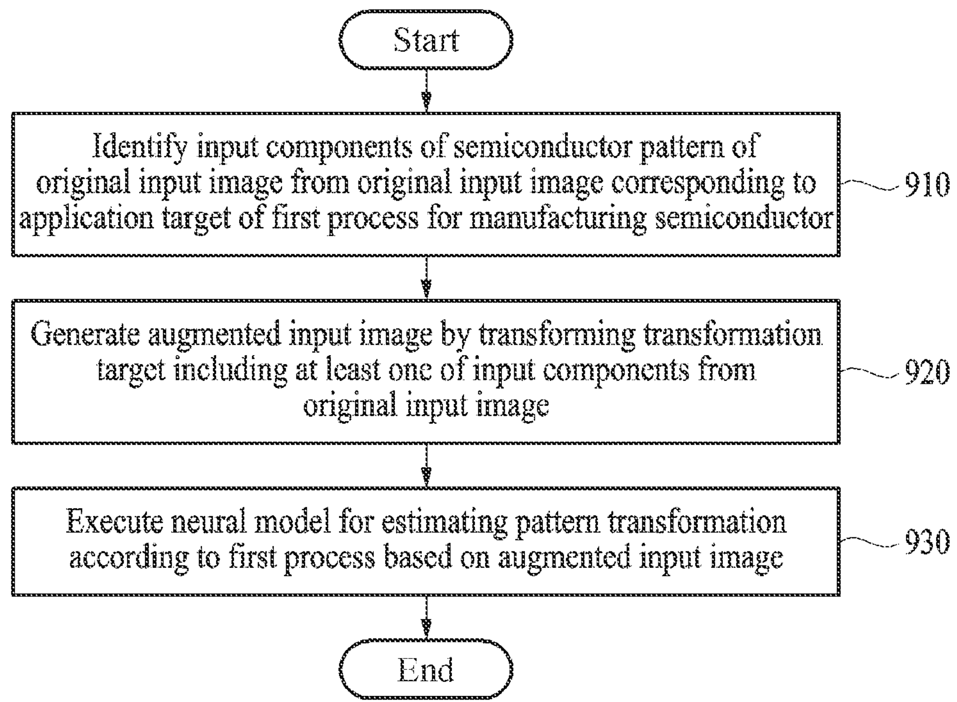
FIG. 9 illustrates an example of a semiconductor image processing method.

FIG. 9 illustrates an example of a semiconductor image processing method. Referring to FIG. 9, a semiconductor image processing apparatus may identify input components of a semiconductor pattern of an original input image from the original input image corresponding to an application target of a first process for manufacturing a semiconductor in operation 910, generate an augmented input image by transforming a transformation target including at least one of the input components from the original input image in operation 920, and execute a neural model for estimating pattern transformation according to the first process based on the augmented input image in operation 930.

Operation 920 may include an operation of generating the augmented input image by removing the transformation target.

The transformation may include at least one of removing of the transformation target, scaling of the transformation target, shifting of the transformation target, and/or rotating of the transformation target.

A portion not corresponding to the transformation target of the original input image may be maintained in the augmented input image.

Operation 910 may include an operation of identifying a group of pixels including a pixel value that is not 0 in the original input image and connected to one another as one input component of the input components.

The semiconductor image processing apparatus may further perform an operation of training the neural model according to an execution result of the neural model.

The semiconductor image processing apparatus may further perform an operation of identifying output components of a semiconductor pattern of the original output image from the original output image corresponding to an application result of the first process and an operation of generating the augmented output image by applying transformation corresponding to the transformation of the transformation target of the original input image to output components of the original output image. Operation 930 may include an operation of training the neural model according to a difference between the augmented output image and a result image corresponding to the execution result of the neural model.

Operation 930 may further perform an operation of executing the neural model based on the original input image and an operation of estimating the pattern transformation according to the first process by combining the execution result of the neural model based on the original input image and the execution result of the neural model based on the augmented input image.

The first process may include at least one of a development process and/or an etching process.

In addition, the descriptions provided with reference to FIGS. 1 to 8 and 10 to 12 may apply to the semiconductor image processing method of FIG. 9.

Figure 10:
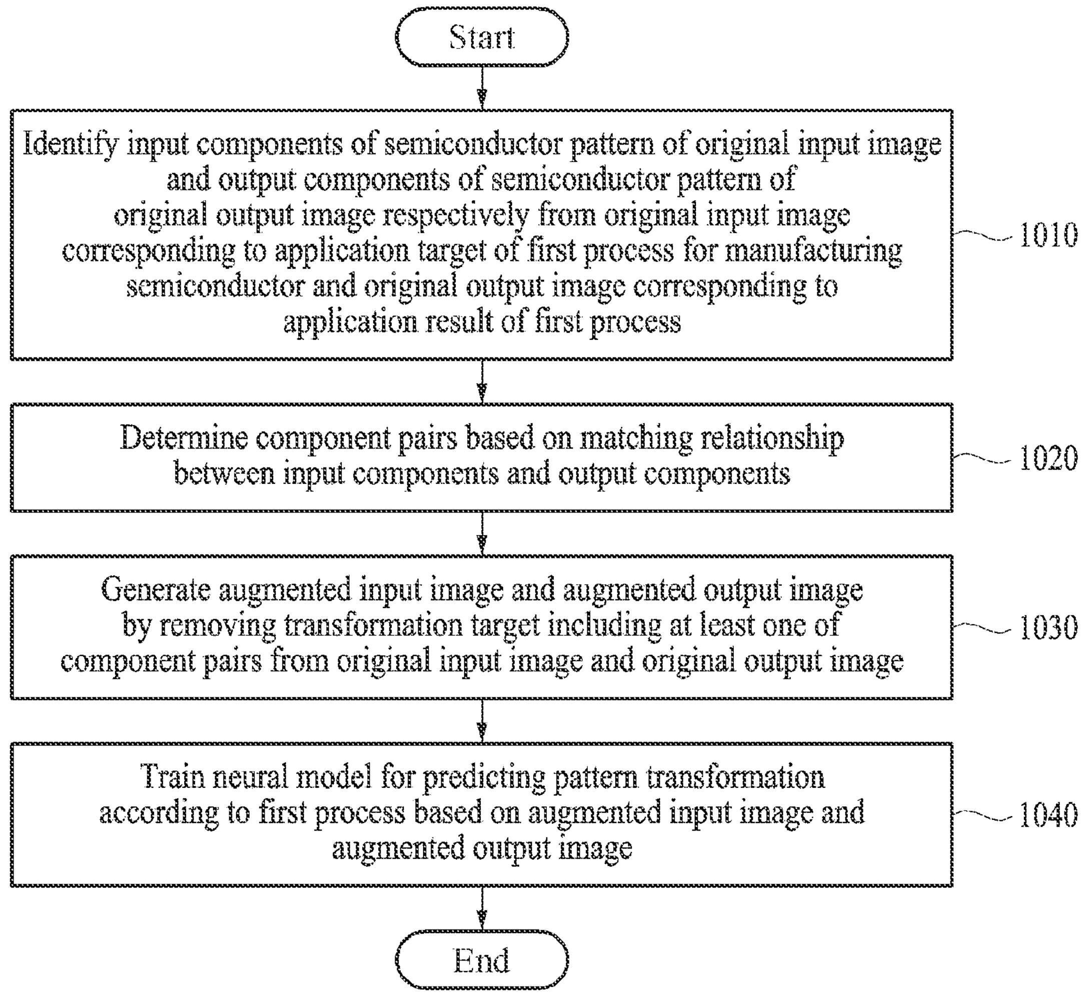
FIG. 10 illustrates an example of a training method of a neural model.

FIG. 10 illustrates an example of a training method of a neural model. Referring to FIG. 10, a semiconductor image processing apparatus may identify input components of a semiconductor pattern of an original input image and output components of a semiconductor pattern of an original output image respectively from the original input image corresponding to an application target of a first process for manufacturing a semiconductor and the original output image corresponding to an application result of the first process in operation 1010, determine component pairs based on a matching relationship between the input components and the output components in operation 1020, generate an augmented input image and an augmented output image by removing a transformation target including at least one of the component pairs from the original input image and the original output image in operation 1030, and train a neural model for predicting pattern transformation according to the first process based on the augmented input image and the augmented output image in operation 1040.

In addition, the descriptions provided with reference to FIGS. 1 to 9 and 11 to 12 may apply to the semiconductor image processing method of FIG. 9.

Figure 11:
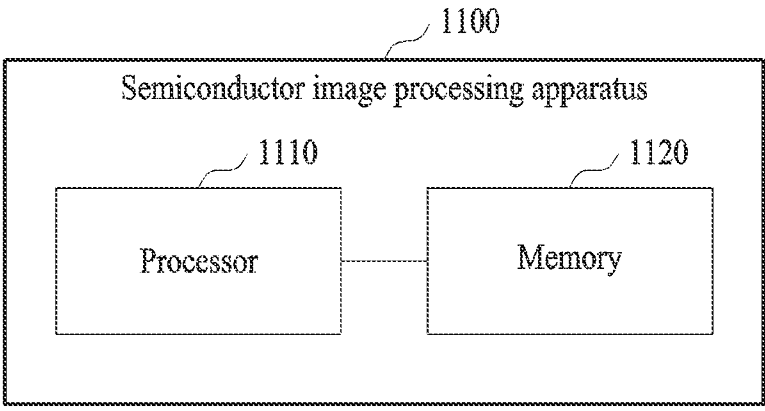
FIG. 11 illustrates an example of a configuration of a semiconductor image processing apparatus.

FIG. 11 illustrates an example of a configuration of a semiconductor image processing apparatus. Referring to FIG. 11, a semiconductor image processing apparatus 1100 may include a processor 1110 (e.g., one or more processors) and a memory 1120 (e.g., one or more memories). The memory 1120 may be connected to the processor 1110 and may store instructions executable by the processor 1110, data to be operated by the processor 1110, or data processed by the processor 1110. The memory 1120 may include a non-transitory computer readable medium, for example, a high-speed random-access memory (RAM), and/or a non-volatile computer readable storage medium (e.g., one or more disk storage devices, flash memory devices, or other non-volatile solid state memory devices). For example, the memory 1120 may include a non-transitory computer-readable storage medium storing instructions that, when executed by the processor 1110, configure the processor 1110 to perform any one, any combination, or all of the operations and methods described herein with reference to FIGS. 1-12.

The processor 1110 may execute the instructions to perform the operations described with reference to FIGS. 1 to 10 and 12.

In addition, the descriptions provided with reference to FIGS. 1 to 10, and 12 may apply to the semiconductor image processing apparatus 1110.

Figure 12:
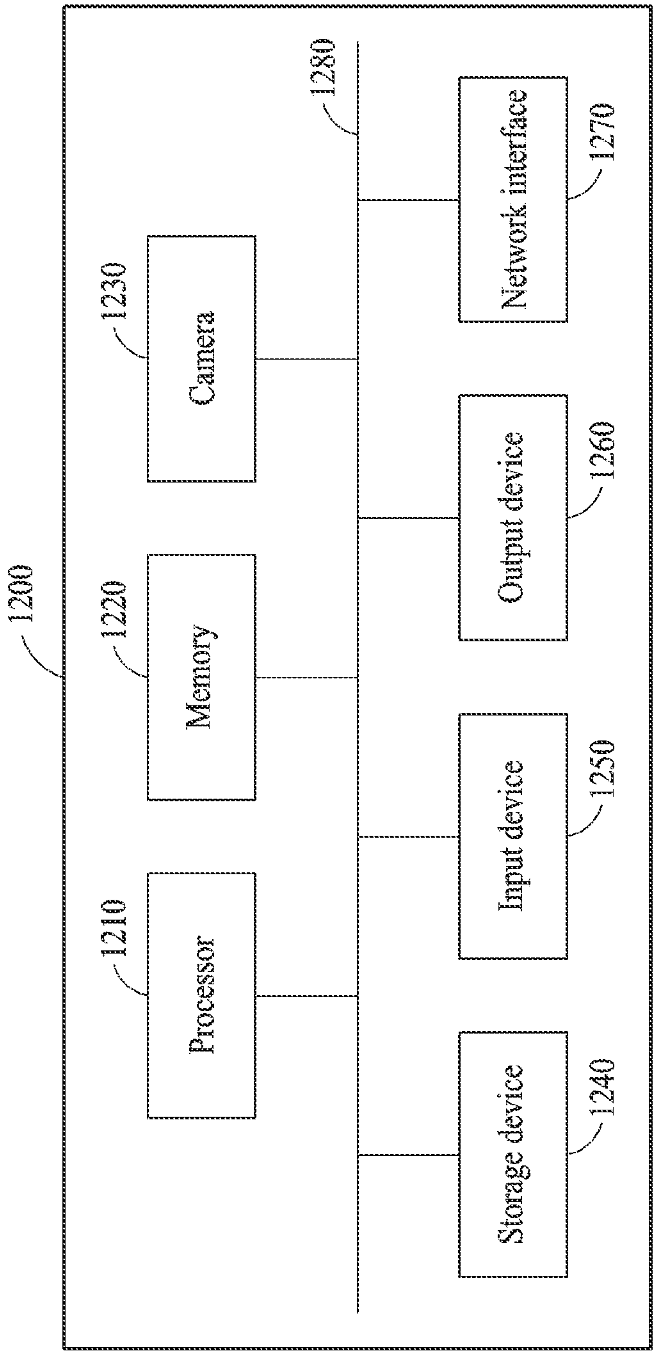
FIG. 12 illustrates an example of a configuration of an electronic device.

FIG. 12 illustrates an example of a configuration of an electronic device. Referring to FIG. 12, an electronic device 1200 may include a processor 1210 (e.g., one or more processors), a memory 1220 (e.g., one or more memories), a camera 1230, a storage device 1240, an input device 1250, an output device 1260, and a network interface 1270 that may communicate with each other through a communication bus 1280. For example, the electronic device 1200 may be implemented as at least one of a mobile device, such as a mobile phone, a smart phone, a personal digital assistant (PDA), a netbook, a tablet computer, and/or a laptop computer, a wearable device, such as a smart watch, a smart band, and/or smart glasses, a home appliance, such as a television (TV), a smart TV, and/or a refrigerator, a security device, such as a door lock, and/or a vehicle, such as an autonomous vehicle, and/or a smart vehicle. The electronic device 1200 may structurally and/or functionally include the semiconductor image processing apparatus 1110 of FIG. 11.

The processor 1210 may execute instructions and functions to be executed in the electronic device 1200. For example, the processor 1210 may process instructions stored in the memory 1220 or the storage device 1240. The processor 1210 may perform the one or more operations described through FIGS. 1 to 11. The memory 1220 may include a computer-readable storage medium or a computer-readable storage device. The memory 1220 may store the instructions to be executed by the processor 1210 and may store related information while software and/or an application is executed by the electronic device 1200. For example, the memory 1220 may include a non-transitory computer-readable storage medium storing instructions that, when executed by the processor 1210, configure the processor 1210 to perform any one, any combination, or all of the operations and methods described herein with reference to FIGS. 1-12.

The camera 1230 may capture a photo and/or a video. The storage device 1240 may include a computer-readable storage medium or a computer-readable storage device. The storage device 1240 may store a greater amount of information than the memory 1220 for a long time. For example, the storage device 1240 may include a magnetic hard disk, an optical disc, a flash memory, a floppy disk, or other non-volatile memories known in the art.

The input device 1250 may receive an input from a user through a traditional input scheme using a keyboard and a mouse, and through a new input scheme, such as a touch input, a voice input, or an image input. For example, the input device 1250 may include a keyboard, a mouse, a touch screen, a microphone, or any other device for detecting the input from the user and transmitting the detected input to the electronic device 1200. The output device 1260 may provide an output of the electronic device 1200 to the user through a visual, auditory, or haptic channel. The output device 1260 may include, for example, a display, a touch screen, a speaker, a vibration generator, or any other device that provides the output to the user. The network interface 1270 may communicate with an external device through a wired or wireless network.

The semiconductor image processing apparatuses, processors, memories, electronic devices, cameras, storage devices, input devices, output devices, network interfaces, communication buses, semiconductor image processing apparatus 1100, processor 1110, memory 1120, electronic device 1200, processor 1210, memory 1220, camera 1230, storage device 1240, input device 1250, output device 1260, network interface 1270, communication bus 1280, and other apparatuses, devices, units, modules, and components disclosed and described herein with respect to FIGS. 1-12 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

identifying input semantic components of a semiconductor pattern of an original input image and output semantic components of a semiconductor pattern of an original output image respectively from the original input image corresponding to an application target of a process for manufacturing a semiconductor and the original output image corresponding to an application result of the process;

determining component pairs based on a matching relationship between the input semantic components and the output semantic components;

generating an augmented input image and an augmented output image by transforming a transformation target being a part of the input semantic components from the original input image and the original output image;

generating a result image based on:

a first execution result of a neural model for estimating pattern transformation according to the process generated by inputting the original input image to the neural model; and a second execution result of the neural model generated by inputting the augmented input image to the neural model; and training the neural model according to the first execution result and the second execution result.

2. The method of claim 1, wherein the generating of the augmented input image comprises generating the augmented input image by removing the transformation target.

3. The method of claim 1, wherein the transforming of the transformation target comprises any one or any combination of any two or more of removing the transformation target, scaling the transformation target, shifting the transformation target, and rotating the transformation target.

4. The method of claim 1, wherein a portion not corresponding to the transformation target of the original input image is maintained in the augmented input image.

5. The method of claim 1, wherein the identifying of the input semantic components comprises identifying, as an input semantic component of the input semantic components, a group of pixels comprising pixel values that are not zero in the original input image and that are connected to one another.

6. The method of claim 1, further comprising:

identifying the output semantic components of the semiconductor pattern of the original output image from the original output image corresponding to the application result of the process; and generating the augmented output image by applying transformation corresponding to transformation of the transformation target of the original input image to the output semantic components of the original output image, wherein the training of the neural model comprises training the neural model according to a difference between the augmented output image and the result image.

7. The method of claim 1, further comprising:

executing the neural model based on the original input image; and estimating the pattern transformation according to the process by combining the first execution result of the neural model based on the original input image and the second execution result of the neural model based on the augmented input image.

8. The method of claim 1, wherein the process comprises either one or both of a development process and an etching process.

9. A non-transitory computer-readable storage medium storing instructions that, when executed by one or more processors, configure the one or more processors to perform the method of claim 1.

10. A processor-implemented method, the method comprising:

identifying input semantic components of a semiconductor pattern of an original input image and output components of a semiconductor pattern of an original output image respectively from the original input image corresponding to an application target of a process for manufacturing a semiconductor and the original output image corresponding to an application result of the process;

determining component pairs based on a matching relationship between the input semantic components and the output components;

generating an augmented input image and an augmented output image by removing a transformation target being a part of the component pairs from the original input image and the original output image; and training a neural model for predicting pattern transformation according to the process based on the augmented input image and the augmented output image.

11. An apparatus, the apparatus comprising:

one or more processors; and a memory comprising a non-transitory computer-readable storage medium storing instructions that, when executed by the one or more processors, configure the one or more processors to:

identify input semantic components of a semiconductor pattern of an original input image and output semantic components of a semiconductor pattern of an original output image respectively from the original input image corresponding to an application target of a process for manufacturing a semiconductor and the original output image corresponding to an application result of the process;

determine component pairs based on a matching relationship between the input semantic components and the output semantic components;

generate an augmented input image and an augmented output image by transforming a transformation target being a part of the input semantic components from the original input image and the original output image;

generate a result image based on:

a first execution result of a neural model for estimating pattern transformation according to the process generated by inputting the original input image to the neural model; and a second execution result of the neural model generated by inputting the augmented input image to the neural model; and train the neural model according to the first execution result and the second execution result.

12. The apparatus of claim 11, wherein, for the generating of the augmented input image, the instructions, when executed by the one or more processors, configure the one or more processors to generate the augmented input image by removing the transformation target.

13. The apparatus of claim 11, wherein, for the transforming of the transformation target, the instructions, when executed by the one or more processors, configure the one or more processors to perform any one or any combination of any two or more of removing the transformation target, scaling the transformation target, shifting the transformation target, and rotating the transformation target.

14. The apparatus of claim 11, wherein a portion not corresponding to the transformation target of the original input image is maintained in the augmented input image.

15. The apparatus of claim 11, wherein, for the identifying of the input semantic components, the instructions, when executed by the one or more processors, configure the one or more processors to identify, as one input semantic component of the input semantic components, a group of pixels comprising pixel values that are not zero in the original input image and that are connected to one another.

16. The apparatus of claim 11, wherein the instructions, when executed by the one or more processors, configure the one or more processors to:

identify output semantic components of the semiconductor pattern of the original output image from the original output image corresponding to the application result of the process;

generate the augmented output image by applying transformation corresponding to transformation of the transformation target of the original input image to the output semantic components of the original output image; and train the neural model according to a difference between the augmented output image and the result image.

17. The apparatus of claim 11, wherein the instructions, when executed by the one or more processors, configure the one or more processors to:

execute the neural model based on the original input image; and estimate the pattern transformation according to the process by combining the first execution result of the neural model based on the original input image and the second execution result of the neural model based on the augmented input image.

18. The apparatus of claim 11, wherein the process comprises either one or both of a development process and an etching process.

* * * * *